Sept. 26, 1939. W. LA HODNY 2,174,090
VANITY MIRROR
Filed May 6, 1937

Inventor
William La Hodny
by Popp and Popp
Attorneys

Patented Sept. 26, 1939

2,174,090

UNITED STATES PATENT OFFICE 2,174,090

VANITY MIRROR

William La Hodny, Buffalo, N. Y.

Application May 6, 1937, Serial No. 141,108

1 Claim. (Cl. 88—102)

This invention relates to a mirror and more particularly to a hand vanity mirror.

One of the principal objects of this invention is to provide a hand vanity mirror in which the entire face of the mirror is free from obstruction, the glass mirror panel being held by a backing plate having its edges spun around the beveled edges of the mirror and the handle being secured to this backing plate in such manner that no part of it projects over the front face of the mirror panel. By this means a mirror having the desired area of effective surface can be made of the minimum size.

A further object of the invention is to provide a hand mirror having a bright metal back and a bright metal handle in keeping with the current tendency of design and to provide a handle which can be die cast, thereby permitting the hand mirror to be manufactured and sold at an extremely low price.

Another object of the invention is to provide such a mirror in which no part of the handle projects over the obverse face of the mirror, the handle being provided with an extension which projects over and is secured to the rear face of the bright metal backing plate.

Another object of the invention is to provide such a hand mirror in which the fastening means between the handle and the backing plate are completely concealed. Other objects of the invention are to provide such a hand mirror which is strong and durable in construction, light in weight and which is extremely attractive in appearance and will fit in with any other dressing table accessories.

Figure 1:
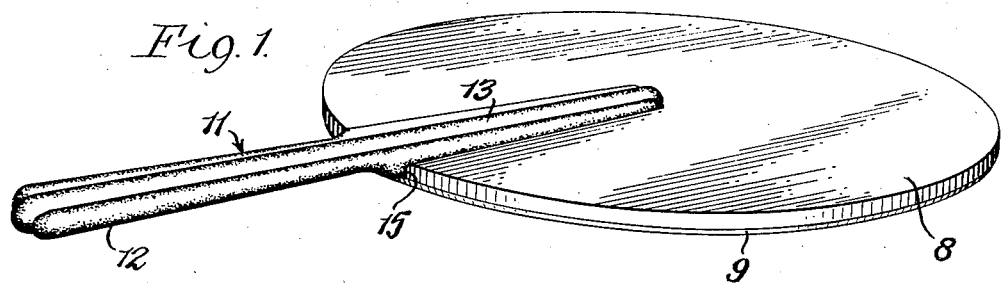
Fig. 1 is a perspective view of the reverse side of a hand mirror embodying my invention.

The hand mirror is shown as comprising a glass panel 5 of substantial dimensions and weight. This panel is shown as being of round form, although it will be understood that it could be made of any other shape, and as having its edges beveled as indicated at 6. The rear face of the glass panel 5 is silvered, as indicated at 7 in any suitable manner.

This glass mirror panel is backed by a metal backing plate 8, the edges 9 of which are spun forwardly and around the bevel 6 of the glass panel 5 so that the panel 5 is securely united to and encased by the metal backing plate 8 and at the same time the full front face of the mirror panel 5 is available for use as a mirror surface. A sheet or disk of paper 10 is preferably interposed between the silvered side of the glass panel 5 and the metal backing plate 8 to form a yielding cushion or mounting for the glass panel and also to protect the silvering 7.

Figure 4:
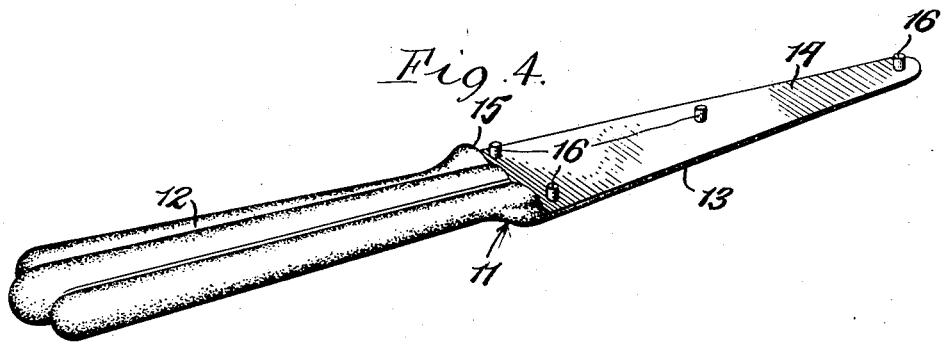
Fig. 4 is a perspective view of the handle member before being applied to the metal backing plate.

The handle member, indicated generally at 11, comprises a grip portion 12 which may be ornamented in any suitable manner and an extension 13 which projects longitudinally outward from the grip portion 12. The back of this extension may be ornamented in any suitable manner and its front face 14 is flat, as best shown in Fig. 4. This flat face 14 is substantially coincident with the centerline or major axis of the grip portion 12 and therefore the grip portion 12 comprises two parts located on opposite sides of the plane of the flat face 14. At the point of juncture between the grip 12 and the extension 13 the grip 12 is formed to provide a shoulder 15 which is laid back for a purpose which will presently appear.

Figure 2:
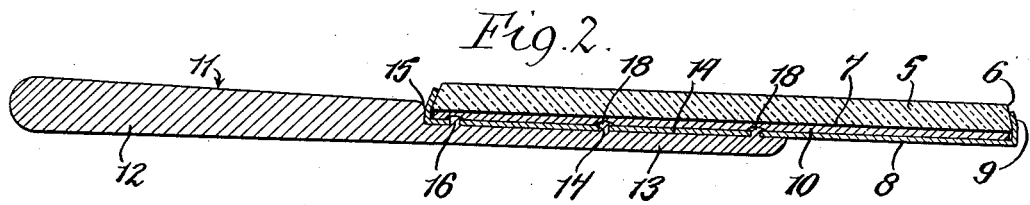
Fig. 2 is a longitudinal central section therethrough.
Figure 3:
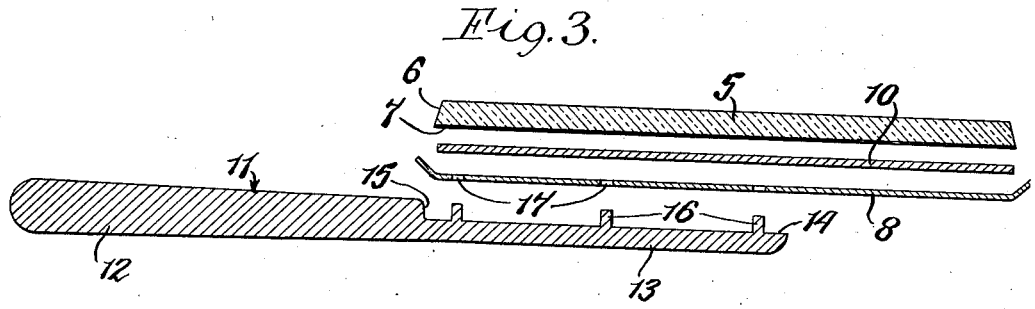
Fig. 3 is an exploded section similar to Fig. 2.

The means for attaching the handle preferably comprise a plurality of pins or studs which are shown as being formed integrally with the extension 13 and project forwardly from the flat face 14. These pins or studs 16 can be provided in any suitable number and are received in registering holes 17 through the backing plate 8, as best illustrated in Fig. 3. After these pins have been so inserted in the holes 17 their ends are riveted over to provide heads 18, as illustrated in Fig. 2.

In assembling the mirror the metal backing plate 8 with its edges only partly turned forward is first attached to the handle member 11. To effect this attachment the studs or pins 16 are passed through the holes 17 and the ends of these pins or studs riveted over to securely unite the metal backing plate and handle. It will be noted that when so attached the extension 13 of the handle member 11 extends to substantially the center of the metal backing plate 8. After this the paper disk or sheet 10 is placed in the backing plate and the glass panel 5 placed on top of the paper sheet or disk 10. The edges of the backing plate 8 are then spun over and against the beveled edge 6 of the mirror as shown at 9 to complete the assembly. To permit of this spinning operation the shoulder 15 is laid back to permit the spinning tool to pass completely around the mirror panel without interference.

It will be appreciated that while I have shown integrally formed studs or pins 16 for effecting union between the handle member 11 and the backing plate 8 other means, such as screws, could be employed for this purpose, it being important, however, that the fastening means employed are applied from the inside of the metal backing plate 8 before the glass panel 5 is inserted, this application of the fastening means providing a mirror which, when assembled, has no externally visible screws, rivets or other fastening members and hence being more attractive in appearance.

From the foregoing it is apparent that the present invention provides a rimless hand mirror in which the full area of the mirror plate is useful. Furthermore the hand mirror shown is extremely attractive in appearance, rugged and durable in construction and can be produced in quantities at a very low cost.

I claim as my invention:

A hand vanity mirror, comprising a flat silvered glass mirror panel of substantial dimensions and weight, a flat metal backing plate for said mirror panel and having its edges formed to embrace and hold the edges of said mirror panel, a handle member including a grip portion and a portion extending longitudinally outward from said grip portion and formed on one side with a flat face adapted to fit against the rear face of said metal backing plate, a plurality of pins formed integrally with said handle member and extending outwardly from said face so as to be invisible from the rear side of said handle, said pins being spaced both lengthwise and transversely of said flat face and extending through corresponding holes provided in said backing plate and a head provided at the end of each of said pins to unite said handle and backing plate, said pins and their heads being thereby concealed by the handle and the silvering of said mirror and being invisible from the exterior of the assembled hand mirror, said longitudinally extending portion extending from the adjacent edge of said backing plate substantially half way across the backing plate.

WILLIAM LA HODNY.